June 3, 1924.  W. W. BAXTER ET AL  1,496,048
FOUNDATION BRAKE GEAR SAFETY CONTROL
Filed Oct. 28, 1920
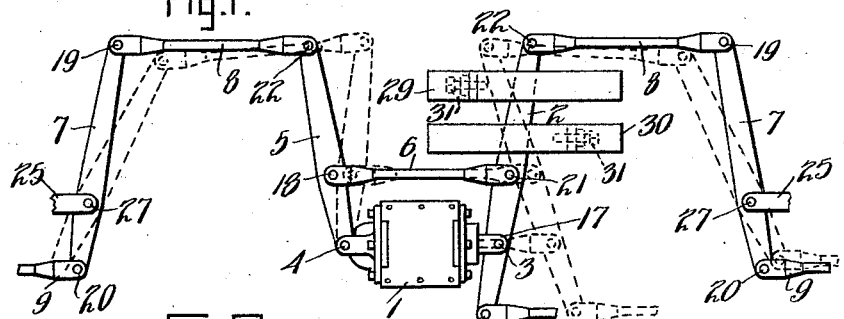
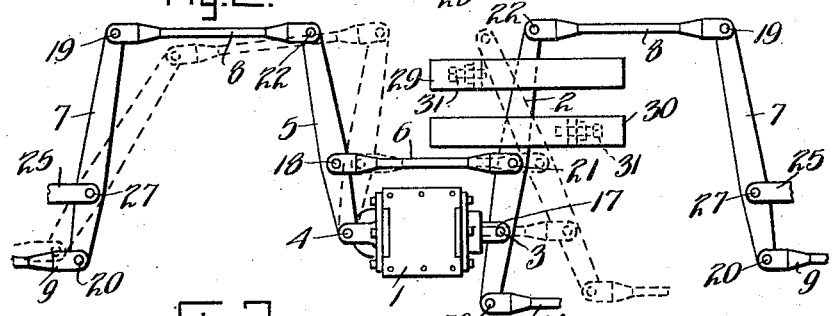
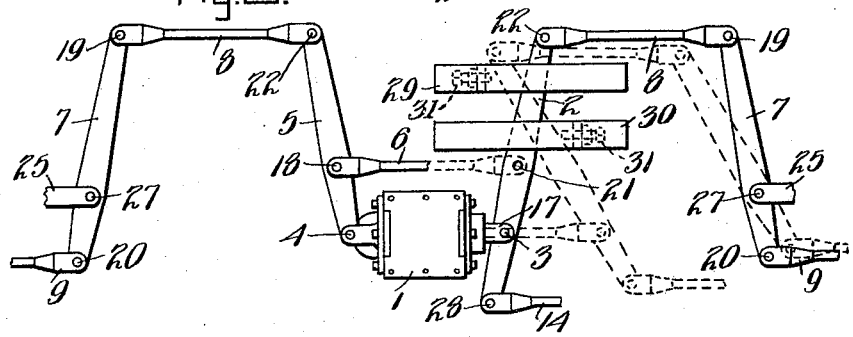
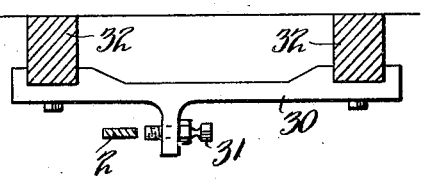
Inventor
William W. Baxter
Lui F. Hellmann
By
Attorney Patented June 3, 1924.

1,496,048

UNITED STATES PATENT OFFICE.

WILLIAM W. BAXTER AND LUI F. HELLMANN, OF INDIANAPOLIS, INDIANA.

FOUNDATION-BRAKE-GEAR SAFETY CONTROL.

Application filed October 28, 1920. Serial No. 420,317.

*To all whom it may concern:*

Be it known that we, WILLIAM W. BAXTER and LUI F. HELLMANN, citizens of the United States, residing at 128 South Traub Avenue and 1549 Leonard Street, respectively, in the city of Indianapolis, county of Marion, and State of Indiana, have invented certain new and useful improvements in a foundation-brake-gear safety control to be used on and in connection with the brake systems of vehicles operated by steam, electricity, or other means of motive force.

The invention relates to brake systems, actuated either by power or by hand, as used on steam, electric, street railway, and other vehicles, and more particularly to that part of the brake system usually designated as the foundation brake gear of the vehicle.

The main object of the invention is to provide a means which will not interfere with the normal operation of the brake system but, after an application of the brakes, will cause sufficient braking power to be applied to the wheels of one truck of the vehicle to stop the vehicle in the event of the failure of any part of the foundation brake of the other truck to function.

Another object of the invention is to provide means which, after an application of the brakes, will cause sufficient braking power to be applied to the wheels of one truck of the vehicle to stop the vehicle should there be excessive brake cylinder piston travel.

Another object of the invention is to provide means which, after an application of the brakes, will cause sufficient braking power to be applied to the wheels of one truck of the vehicle to stop the vehicle in the event of the loss of any fundamental part or parts of the foundation brake gear of the other truck of the vehicle.

A feature of the invention is the simplicity of construction of the various parts and the ease with which the same may be installed as a part of any of the many forms of foundation brake gear.

The full nature of the invention, including objects and features not enumerated, will be more readily understood by reference to the accompanying drawings and the following descriptions and claim.

Fig. 1 is a fragmentary view of the foundation brake gear of a vehicle, showing one of many forms now in use, and which may be actuated either manually or by power mechanism. The full lines show the parts in normal running or brake release position and the dotted lines show the parts in the positions assumed after an application of the brakes. Also shown in Fig. 1 are the brackets 29 and 30 that carry the adjustable stop pins 31, which provide fulcrums for the live cylinder lever 2 in the event of the failure of the foundation brake gear, as will be more fully explained.

Fig. 2 is a fragmentary view of the same form of foundation brake gear as shown in Fig. 1. The full lines show the parts in normal running or brake release position and the dotted lines show the parts in the positions assumed after an application of the brakes, it being assumed that the pin 22 of the front truck brake gear has been either lost or broken.

Fig. 3 is a fragmentary view of the same form of foundation brake gear as shown in Figs. 1 and 2. The full lines show the parts in normal running or brake release position and the dotted lines show the parts in the positions assumed after an application of the brakes, it being assumed that the pin 21 has been either lost or broken.

Fig. 4 illustrates the bracket 30, carrying the adjustable stop pin 31, as it is fastened to the under-sills 32 of the vehicle.

In Fig. 1 a pneumatic brake cylinder 1 having a push rod 17 is shown attached to the live cylinder lever 2, of the foundation brake gear, by a pin 3. The dead cylinder lever 5 is attached to the back end of the brake cylinder 1 by a pin 4. Attached to the live cylinder lever 2 by a pin 21 is the tie rod 6 the other end of which is connected to the dead cylinder lever 5 by a pin 18.

Connected to the outer end of the live cylinder lever 2 by a pin 22 is one end of the front truck brake rod 8 the other end of when is attached to the front truck live lever 7 by a pin 19. The lower end of the live truck lever 7 is connected to the front truck bottom rod 9 by a pin 20. Brake beams 25 are connected to the truck levers 7 by pins 27. It is to be understood that the pins 4 and the pin supporting the dead truck levers (not shown) are the only fixed points in the entire foundation brake gear and that all of the other pins are free to move with the rods and levers to which they are attached.

Attached to the live cylinder lever 2 by a pin 28 is the hand brake rod 14.

The parts of the foundation brake gear of the rear truck are the same as those of the front truck and will require no explanation.

In a normal application of the brakes by pneumatic pressure compressed air would enter the brake cylinder 1 and cause the push rod 17 to move outward, as shown in Fig. 1. This action would in turn cause the tie rod 6, the dead cylinder lever 5, the rear truck brake rod 8 and the live cylinder lever 2 to move in the same direction. The live truck lever 7 of the rear truck turning about the pin 27 would cause the front brake shoe of the rear truck to be pressed against the front wheel of the rear truck. This movement of the parts would cause the lower end of the live truck lever 7 of the rear truck to move the rear truck bottom rod 9 backward which in turn would cause the brakes of the rear truck to be operated in known manner.

When the push rod 17 has moved far enough to cause the brake shoes of the rear truck to be forced against the wheels of the rear truck the live cylinder lever 2 would then turn about the pin 21, Fig. 1, and cause the front truck brake rod 8 to move backward and the same sequence of movements of the parts of the foundation brake gear of the front truck would take place as took place in the rear truck which would result in a brake application to the wheels of the front truck.

It can be readily seen from the foregoing description that the pins 21 and 22 act as the principal fulcrums for the foundation brake gear of the vehicle and should either of these become lost or broken, or any of the parts directly connected to them be lost or broken there would be no application of the brakes on the vehicle. It would seem that if the pin 22 were removed as shown in Fig. 2, that the outward movement of the push rod 17 would cause an application of the brakes on the rear truck without the aid of any fulcrum such as the stop pin 31 in the bracket 29, but the travel of the push rod 17 is limited by the length of the brake cylinder 1 and the lost motion of the parts of the foundation brake gear is usually so great that the push rod would reach the limit of its travel without having forced the brake shoes against the wheels of the vehicle. The same conditions also exist in the foundation brake gear of the front truck and if the pin 21 Fig. 3, where removed or if any of the other parts of the foundation brake gear of the rear truck should fail to function there would be no application of the brakes on the front truck without the aid of some kind of a fulcrum for the live cylinder lever 2, such as the adjustable stop pin 31 in the bracket 30. It will be noted from the drawings that the bracket 30 can be attached to any vehicle and the stop pin 31 so positioned that the live cylinder lever 2 will strike it before the limit of the travel of the push rod 17 has been reached and thus the live cylinder lever 2 will always strike the pin 31 in either the bracket 29 or 30 and cause an application of the brakes on at least one truck of the vehicle sufficient to bring the vehicle to a stop.

The same results would be obtained if the power were applied to the hand brake wheel connected to the hand brake rod 14, Fig. 1, as the live cylinder lever would be caused to move outward the same as if the power had been applied by the push rod 17. And as can be understood the travel of the hand brake rod is also limited by the length of the brake cylinder 1 so that in the event of the failure of any of the parts of the foundation brake gear the stop pins 31 would act as fulcrums for the live cylinder lever 2 to cause a brake application.

The foregoing description is general and could be applied to any of the many forms of foundation brake gear now in use as all of them are so constructed that the movement of the various parts is the same as that just described.

The invention claimed is:

A foundation brake gear comprising a brake cylinder, live and dead levers connected to the brake cylinder near one end, links at the other ends of the levers extending respectively to the brakes for the front and rear trucks, a link connecting the levers at an intermediate point, spaced guides for the live lever between the points of attachment of said links, and opposed stops on the respective guides for limiting the movements of the live lever, substantially as set forth.

In testimony whereof we have signed our names to this specification in the presence of two subscribing witnesses.

WILLIAM W. BAXTER.
LUI F. HELLMANN.

Witnesses:
 HARRY B. SMITH,
 FRANK SIMS.